(12) United States Patent
Podgorski et al.

(10) Patent No.: US 10,301,723 B2
(45) Date of Patent: May 28, 2019

(54) TURBINE ENGINE PART COATED WITH A PROTECTIVE CERAMIC COATING, METHOD FOR MANUFACTURING AND FOR USING SUCH A PART

(71) Applicant: SAFRAN, Paris (FR)

(72) Inventors: Michael Podgorski, Paris (FR); Patrice Berthod, Pont à Mousson (FR); Stéphane Mathieu, Vandoeuvre les Nancy (FR); Léo Portebois, Vemecourt sur Madon (FR); Michel Vilasi, Bouxieres aux Dames (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 15/754,486

(22) PCT Filed: Oct. 4, 2016

(86) PCT No.: PCT/FR2016/052537
§ 371 (c)(1),
(2) Date: Feb. 22, 2018

(87) PCT Pub. No.: WO2017/060603
PCT Pub. Date: Apr. 13, 2017

(65) Prior Publication Data
US 2019/0024243 A1    Jan. 24, 2019

(30) Foreign Application Priority Data
Oct. 7, 2015 (FR) ..................... 15 59532

(51) Int. Cl.
| C23C 30/00 | (2006.01) |
| F01D 5/28 | (2006.01) |
| F01D 9/04 | (2006.01) |
| F01D 25/00 | (2006.01) |
| C04B 35/01 | (2006.01) |
| C04B 35/10 | (2006.01) |
| C04B 35/119 | (2006.01) |

(Continued)

(52) U.S. Cl.
CPC .............. *C23C 30/00* (2013.01); *C04B 35/01* (2013.01); *C04B 35/10* (2013.01); *C04B 35/109* (2013.01);
(Continued)

(58) Field of Classification Search
CPC ......... C23C 30/00; F01D 5/288; F01D 9/041; F01D 25/007; F05D 2220/323;
(Continued)

(56) References Cited

U.S. PATENT DOCUMENTS 7,935,387 B2 * 5/2011 Lee ........................ C23C 28/321
427/419.2
9,865,434 B2 * 1/2018 Sun ...................... C23C 16/4404
(Continued)

FOREIGN PATENT DOCUMENTS

| WO | WO 2008/000247 A1 | 1/2008 |
| WO | WO 2009/125204 A1 | 10/2009 |

OTHER PUBLICATIONS

Mamani et al., "Microstructure and mechanical properties at elevated temperatures of polycrystalline Al2O3—YAG—ZrO2 eutectic composition composites", ECCM15—15th European Conference on Composite Materials, Venice Italy, Jun. 2012. (Year: 2012).*
(Continued)

*Primary Examiner* — Jonathan C Langman
(74) *Attorney, Agent, or Firm* — Pillsbury Winthrop Shaw Pittman LLP

(57) ABSTRACT

A turbine engine part includes at least a substrate, and present on the substrate, a ceramic coating for protection against calcium and magnesium aluminosilicates, the ceramic coating including $Al_2O_3$ at a molar content lying in the range 33% to 49%, $Y_3Al_5O_{12}$ at a molar content lying in the range 21% to 53%, and yttria-stabilized zirconia at a molar content lying in the range 13% to 31%.

10 Claims, 1 Drawing Sheet

(51) Int. Cl.
*C04B 35/109* (2006.01)
*C04B 35/505* (2006.01)

(52) U.S. Cl.
CPC .......... *C04B 35/119* (2013.01); *C04B 35/505* (2013.01); *F01D 5/288* (2013.01); *F01D 9/041* (2013.01); *F01D 25/007* (2013.01); *B32B 2264/107* (2013.01); *F05D 2220/323* (2013.01); *F05D 2230/90* (2013.01); *F05D 2240/128* (2013.01); *F05D 2240/24* (2013.01); *F05D 2260/95* (2013.01); *F05D 2300/2112* (2013.01); *F05D 2300/506* (2013.01)

(58) Field of Classification Search
CPC .......... F05D 2230/90; F05D 2240/128; F05D 2240/24; F05D 2260/95; F05D 2300/2112; F05D 2300/506; C04B 35/01; C04B 35/10; C04B 35/109; C04B 35/119; C04B 35/505; B32B 2264/107
See application file for complete search history.

(56) References Cited

U.S. PATENT DOCUMENTS

| | | | |
|---|---|---|---|
| 2003/0000151 A1* | 1/2003 | Rosenflanz | B24D 3/06 51/309 |
| 2004/0001977 A1* | 1/2004 | Subramanian | C23C 28/00 428/702 |
| 2009/0169914 A1 | 7/2009 | Fu et al. | |

OTHER PUBLICATIONS

Su et al. "Preparation and characterization of Al2O3/Y3Al5O12/zro2 ternary hypoeutectic in situ composites by laser rapid solidification", Journal of Applied Physics, vol. 104, p. 023511-1 to 023511-7, 2008. (Year: 2008).*

Calderon-Moreno, "Microstructure and mechanical properties of quasi-eutectic Al2O3—Y3Al5O12—ZrO2 ternary composites rapidly solidified from melt", Materials Science and Engineering, vol. 375-377, (2004), pp. 1246-1249. (Year: 2004).*

International Search Report as issued in International Patent Application No. PCT/FR2016/052537, dated Dec. 15, 2016.

Drexler, J. M., et al., "Thermal-gradient testing of thermal barrier coatings under simultaneous attack by molten glassy deposits and its mitigation," Surface & Coatings Technology, vol. 204, No. 16-17, May 2010, XP026995596, pp. 2683-2688.

Drexler, J. M., et al. "Air-plasma-sprayed thermal barrier coatings that are resistant to high-temperature attack by glassy deposits," Acta Materialia, vol. 58, No. 20, Dec. 2010, XP027422970, pp. 6835-6844.

Aygun, A., et al., "Novel thermal barrier coatings that are resistant to high-temperature attack by glassy deposits," Acta Materialia, vol. 55, No. 20, Oct. 2007, XP022442737, pp. 6734-6745.

* cited by examiner

TURBINE ENGINE PART COATED WITH A PROTECTIVE CERAMIC COATING, METHOD FOR MANUFACTURING AND FOR USING SUCH A PART

CROSS REFERENCE TO RELATED APPLICATIONS

This application is the U.S. National Stage of PCT/FR2016/052537 filed Oct. 4, 2016, which in turn claims priority to French Application No. 1559532 filed Oct. 7, 2015. The contents of both applications are incorporated herein by reference in their entirety.

BACKGROUND OF THE INVENTION

The present invention relates to the general field of protective coatings for parts used in high-temperature environments. The invention applies more particularly, but not exclusively, to the thermal barriers used to protect superalloy parts in aviation gas turbines.

The parts present in the hot portions of aviation turbine engines operating in desert environments or in very polluted environments can become damaged because of attack by sand or by alkaline compounds present in the air ingested by the engine. These compounds, which include in particular calcium and magnesium aluminosilicates (CMAS), can degrade the thermal barrier layer covering certain parts in the hot portions of the turbine engine.

The mechanisms whereby CMAS particles degrade the thermal barrier include in particular CMAS infiltrating in the liquid state into the thermal barrier layer, and the thermal barrier layer (which is conventionally constituted by a ceramic based on yttria-stabilized zirconia (YSZ)) being dissolved and re-precipitating in the form of yttria-poor zirconia. Those two mechanisms reduce the mechanical properties of the thermal barrier layer and can lead to it cracking during stages of the engine cooling. Furthermore, ingesting solid particles gives rise to erosion phenomena of the thermal barrier layer which spalls and lays bare the underlying substrate, thus reducing the lifetime of the parts.

Solutions exist for limiting the infiltration of CMAS into the thermal barrier layer. By way of example, mention may be made of using a coating for protecting the thermal barrier that is based on gadolinium-doped zirconia (e.g. referred to as gadolinium zirconate), or indeed using alumina or titanium oxide. On reacting with CMAS, those coatings encourage precipitation of CMAS and thus serve to limit penetration thereof into the thermal barrier. Nevertheless, those coatings present the drawback of being sacrificial, which requires permanent maintenance, and also regular monitoring of the state of the parts.

There therefore exists a need to have a coating for protecting parts from CMAS that presents a lifetime that is long, in particular in the operating environments and conditions of an aviation turbine engine.

OBJECT AND SUMMARY OF THE INVENTION

A main object of the present invention is to thus to mitigate such drawbacks by proposing a turbine engine part comprising at least a substrate, and present on the substrate, a ceramic coating for protection against calcium and magnesium aluminosilicates, the ceramic coating comprising:

$Al_2O_3$ (alumina) at a molar content lying in the range 33% to 49%;

$Y_3Al_5O_{12}$ (yttrium aluminum garnet or YAG) at a molar content lying in the range 21% to 53%; and yttria-stabilized zirconia (YSZ, fluorite phase) at a molar content lying in the range 13% to 31%.

The coated part of the invention is remarkable by the composition of its ceramic coating. Specifically, such a ceramic coating presents the advantage of developing a protective layer when it reacts on contact with calcium and magnesium aluminosilicates (CMAS) at high temperature.

The inventors have observed that after the part has been used in an oxidizing medium at a temperature higher than 1000° C. and in contact with CMAS compounds (i.e. compounds comprising in particular oxides of calcium, of magnesium, of aluminum, and of silicon), a protective layer forms in the ceramic coating in its outer surface (i.e. the surface of the coating situated remote from the substrate). This protective layer has compounds in crystallized form such as spinel ($MgAl_2O_4$), anorthite ($CaAlSi_2O_8$), and garnet (a mixed oxide that may include in particular the following elements Mg, Al, Si, Ca, Fe, and Y). The inventors have also observed that this crystallized protective layer is impermeable to CMAS. In other words, CMAS does not infiltrate through the protective layer formed in the coating. Thus, such a coating protects the underlying substrate and increases its lifetime.

Preferably, the ceramic coating comprises:

$Al_2O_3$ at a molar content lying in the range 37% to 45%;

$Y_3Al_5O_{12}$ at a molar content lying in the range 29% to 45%; and yttria-stabilized zirconia at a molar content lying in the range 17% to 27%.

Also preferably, the composition of the coating may correspond substantially to the composition of an alumina-YAG-YSZ eutectic ceramic material. Such a eutectic ceramic presents a molar content of about 41% alumina, about 37% YAG, and about 22% YSZ. This composition is advantageous since the eutectic presents an interleaved three-dimensional structure, in particular when it is fabricated by a directed solidification method. Such a eutectic ceramic coating conserves good mechanical properties up to temperatures that are close its melting temperature.

Also preferably, the ceramic coating has a thickness lying in the range 50 micrometers ($\mu m$) to 200 $\mu m$, e.g. in the range 150 $\mu m$ to 200 $\mu m$.

The substrate may comprise a material selected from the following: a metal superalloy (e.g. based on nickel) and a ceramic matrix composite material.

The part may further comprise a thermal barrier layer present between the substrate and the ceramic coating. By way of example, this thermal barrier layer may comprise a ceramic based on yttria-stabilized zirconia. Under such circumstances, the ceramic coating prevents CMAS infiltrating into the inside of the thermal barrier layer, thereby avoiding degradation thereof and increasing its lifetime.

The substrate may constitute a part for an aviation turbine engine selected from among the following parts: a turbine blade; at least a portion of a turbine nozzle; and at least a portion of a turbine ring.

The invention also provides a method of fabricating a turbine engine part as described above, the method comprising at least a step of forming the ceramic coating on the substrate, the ceramic coating comprising:

$Al_2O_3$ at a molar content lying in the range 33% to 49%;

$Y_3Al_5O_{12}$ at a molar content lying in the range 21% to 53%; and yttria-stabilized zirconia at a molar content lying in the range 13% to 31%.

The ceramic coating may be formed by sintering.

In a variant, the ceramic coating may be formed by directed solidification. For example, the ceramic coating may be formed by depositing a mixture of powders of yttria, of alumina, and of zirconia (or a mixture of powders of alumina, of YAG, and of YSZ) on the substrate, and then performing directed solidification by laser melting (the coating may optionally be performed in a plurality of passes). The method presents the advantage of forming a ceramic coating that does not have any grain boundaries, thereby further improving its mechanical properties.

Finally, the invention provides a method of using a turbine engine part as described above, the method comprising a step of using the part at a temperature higher than 1000° C. in an oxidizing medium and in the presence of calcium and magnesium aluminosilicates. These conditions of use correspond substantially to the environmental conditions in which the hot portions of an aviation turbine engine are to be found when operating in a desert (which conditions exist in particular in the turbines of the engine).

The part may in particular be used at a temperature that is greater than or equal to 1300° C.

BRIEF DESCRIPTION OF THE DRAWING

Other characteristics and advantages of the present invention appear from the following description made with reference to the accompanying drawing which show embodiments having no limiting character. In the figures.

DETAILED DESCRIPTION OF THE INVENTION

Figure 1:
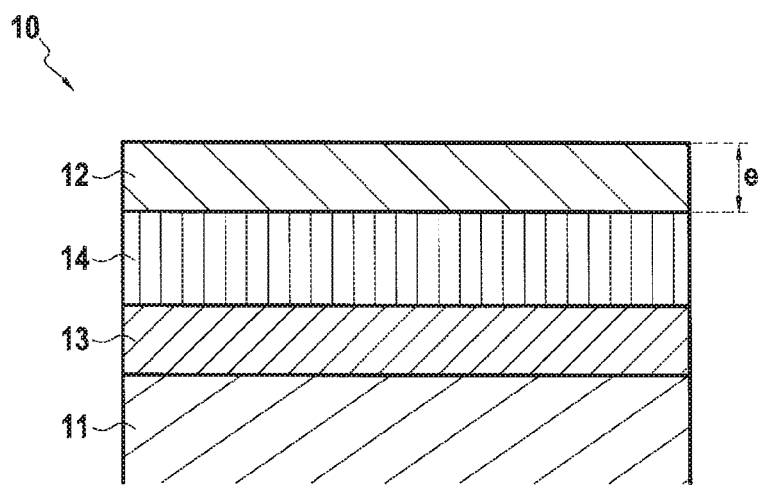
FIGS. 1 and 2 are enlarged section views of the surfaces of turbine engine parts in two embodiments of the invention.

FIG. 1 is an enlarged section view of the surface of a turbine engine part 10 comprising a substrate 11 coated in a ceramic coating 12 for providing protection against calcium and magnesium aluminosilicates (CMAS). The part 10 comprises in this order: the substrate 11, an adhesion layer 13, a thermal barrier layer 14, and the ceramic coating 12.

In accordance with the invention, the ceramic coating 12 comprise alumina ($Al_2O_3$) having a molar content lying in the range 33% to 49%, and more particularly in the range 37% to 45%. The ceramic coating 12 also comprises yttrium aluminum garnet ($Y_3Al_5O_{12}$ or YAG) and has a molar content lying in the range 21% to 53%, more preferably lying in the range 29% to 45%. The ceramic coating 12 also comprises yttria-stabilized zirconia (YSZ) at a molar content lying in the range 13% to 31%, and more preferably lying in the range 17% to 27%. The ceramic coating 12 may comprise only YAG, alumina, and YSZ. In other words, the ceramic coating 12 need not have any compound other than YAG, alumina, or YSZ.

By way of example, the substrate 11 may comprise a metal superalloy, e.g. a nickel-based superalloy, or a ceramic matrix composite material.

In the example shown in FIG. 1, the ceramic coating 12 is directly in contact with the thermal barrier layer 14, and is present on the surface of that layer 14. By way of example, the thickness e of the coating 12 may lie in the range 50 µm to 200 µm. The adhesion layer 13 is present between the substrate 11 and the thermal barrier layer 14, and is directly in contact therewith.

In known manner, the thermal barrier layer 14 may comprise yttria stabilized zirconia (YSZ), which presents a columnar structure.

The adhesion layer 13, which is itself known, serves to provide good adhesion between the thermal barrier layer 14 and the substrate 11. More generally, such an adhesion layer 13 serves to provide good mechanical compatibility between the thermal barrier layer 14 and the substrate 11, in particular serving to compensate for any differential thermal expansion that might exist between the materials of the layer 14 and of the substrate 11.

When the substrate 11 comprises a metal superalloy, the adhesion layer 13 may for example comprise a simple or a modified aluminide (e.g. NiCrAlY for a nickel-based superalloy substrate), that may oxidize in part or that may form an oxide layer (also known as a thermally grown oxide (TGO) layer).

When the substrate 11 comprises a ceramic matrix composite material, the adhesion layer 13 may comprise silicon.

In general manner, the adhesion layer 13 is adapted as a function of the material making up the substrate 11 and the thermal barrier layer 14.

Figure 2:
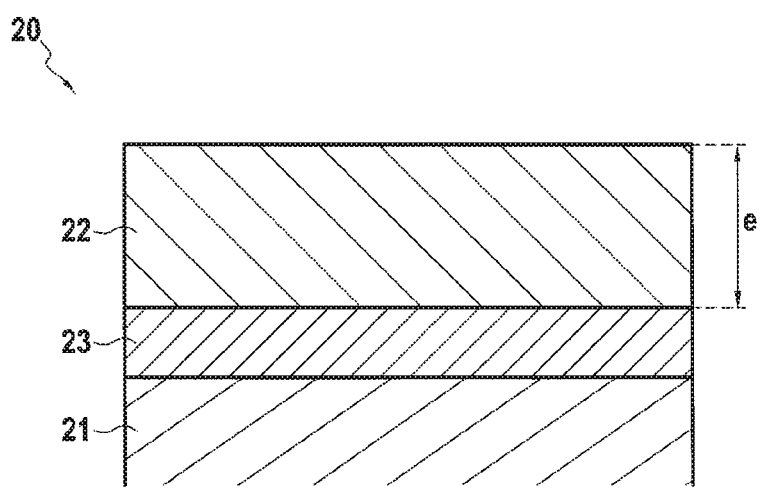

FIG. 2 is an enlarged section view of the surface of a turbine engine part 20 in another embodiment of the invention. In this example, the part 20 comprises in this order: a substrate 21, an adhesion layer 23, and a ceramic coating 22. Unlike the example of FIG. 1, the part 20 in this example does not have an additional thermal barrier layer. Specifically, in this example, the ceramic coating 22 acts as a thermal barrier that protects the substrate 21.

The substrate 21, the adhesion layer 23, and the ceramic coating 22 may present characteristics that are identical respectively to the substrate 11, to the adhesion layer 13, and to the ceramic coating 12 of the example of FIG. 1. Nevertheless, it is possible to modify the thickness e of the ceramic coating 22, e.g. by increasing it compared with the example of FIG. 1.

In the example of FIG. 2, the adhesion layer 23 is present between the substrate 21 and the ceramic coating 22, and is directly in contact therewith. Like the part 10 of FIG. 1, the material forming the adhesion layer 23 may be adapted as a function of the material forming the substrate 21.

In the example shown, the substrates 11, 21 of the part 10, 20 may consist in an aviation turbine engine part selected from the following: a turbine blade, at least a portion of a turbine nozzle, at least a portion of a turbine ring.

Naturally, the invention is not limited to the configurations described above with reference to the examples shown, and it is entirely possible to envisage using other configurations of parts coated in a ceramic coating in the context of the invention.

The present invention also provides a method of fabricating a part 10, 20 of the invention. Such a method comprises at least a step that consists in forming a ceramic coating 12, 22 of the kind described above on the substrate 11, 21 of the part. The ceramic coating 12 may be formed directly on a thermal barrier layer 14 present on the substrate 11, or in a variant directly on an adhesion layer 23 present on the substrate 21.

The ceramic coating 12, 22 may be formed by sintering a powder composition comprising appropriate quantities of alumina, yttria, and zirconia. Under such circumstances, it should be observed that yttrium aluminum garnet (YAG) and yttria-stabilized zirconia (YSZ) are formed as a result of the sintering step. It is also possible to sinter directly a mixture of powders that comprise alumina, YAG, and YSZ.

In a variant, the ceramic coating 12, 22 may be formed by a method of directed solidification using laser melting. For this purpose, powders of alumina, yttria, and zirconia may be placed on the substrate and then the deposited suspension layer can be subjected to laser melting in order to obtain the ceramic coating. As for sintering, under such circumstances, yttrium aluminum garnet and yttria-stabilized zirconia are formed as a result of the directed solidification step. It is also possible to make use directly of a mixture of powders comprising alumina, YAG, and YSZ.

The present invention also provides a method of using a part 10, 20 of the invention. Such a method comprises a step of using the part 10, 20 at a temperature higher than 1000° C. in an oxidizing medium and in the presence of calcium and magnesium aluminosilicates. Such conditions of use correspond substantially to the environmental conditions in which the hot portions of an aviation turbine engine operate in a desert environment (these conditions existing in particular within the turbines of the engine). When a part 10, 20 of the invention is used under such conditions, the ceramic coating 12, 22 reacts with the calcium and magnesium aluminosilicates that come into contact therewith to form a protective layer that is impermeable to calcium and magnesium aluminosilicates. Thus the substrate 11, 21 of the part 10, 20 is protected by the coating 12, 22 of the invention.

The invention claimed is:

1. A turbine engine part comprising at least a substrate, and present on the substrate, a ceramic coating for protection against calcium and magnesium aluminosilicates, the ceramic coating comprising:

$Al_2O_3$ at a molar content lying in the range 33% to 49%;

$Y_3Al_5O_{12}$ at a molar content lying in the range 21% to 53%; and yttria-stabilized zirconia at a molar content lying in the range 13% to 31%.

2. A part according to claim 1, wherein the ceramic coating comprises:

$Al_2O_3$ at a molar content lying in the range 37% to 45%;

$Y_3Al_5O_{12}$ at a molar content lying in the range 29% to 45%; and yttria-stabilized zirconia at a molar content lying in the range 17% to 27%.

3. A part according to claim 1, wherein the ceramic coating has a thickness lying in the range 50 μm to 200 μm.

4. A part according to claim 1, wherein the substrate comprises a material selected from the following: a metal superalloy and a ceramic matrix composite material.

5. A part according to claim 1, further comprising a thermal barrier layer present between the substrate and the ceramic coating.

6. A part according to claim 1, wherein the substrate constitutes a part for an aviation turbine engine selected from among the following parts: a turbine blade; at least a portion of a turbine nozzle; and at least a portion of a turbine ring.

7. A method of fabricating a part according to claim 1, the method comprising at least a step of forming the ceramic coating on the substrate, the ceramic coating comprising:

$Al_2O_3$ at a molar content lying in the range 33% to 49%;

$Y_3Al_5O_{12}$ at a molar content lying in the range 21% to 53%; and yttria-stabilized zirconia at a molar content lying in the range 13% to 31%.

8. A method according to claim 7, wherein the ceramic coating is formed by sintering.

9. A method according to claim 7, wherein the ceramic coating is formed on the substrate by directed solidification.

10. A method of using a part according to claim 1, comprising a step of using the part at a temperature higher than 1000° C. in an oxidizing medium and in the presence of calcium and magnesium aluminosilicates.

* * * * *